United States Patent [19]
Gilbert et al.

[11] Patent Number: 5,559,810
[45] Date of Patent: Sep. 24, 1996

[54] COMMUNICATION OF DATA RECEPTION HISTORY INFORMATION

[75] Inventors: Stephen S. Gilbert; Michael L. Needham, both of Palatine; Kenneth J. Crisler, Wheaton, all of Ill.

[73] Assignee: Motorola, Inc., Schaumburg, Ill.

[21] Appl. No.: 220,619

[22] Filed: Mar. 31, 1994

[51] Int. Cl.$^6$ .................................................. G06F 11/00
[52] U.S. Cl. ..................... 371/5.1; 371/35; 371/5.5; 371/32; 375/259; 375/267; 455/102
[58] Field of Search .................. 371/5.1, 48, 20.1, 371/11.2, 8.2, 15.1, 37.1, 35, 30, 5.5, 41, 32, 33; 235/92; 370/11, 13, 60, 12, 9; 375/219, 226, 267, 340, 259, 260, 369; 455/97, 93, 102, 105, 108, 110, 112, 121

[56] References Cited

U.S. PATENT DOCUMENTS

| | | | |
|---|---|---|---|
| 4,040,023 | 8/1977 | Curtis et al. | 364/900 |
| 4,208,630 | 6/1980 | Martinez | 375/7 |
| 4,665,478 | 5/1987 | Hirose et al. | 364/200 |
| 4,715,045 | 12/1987 | Lewis et al. | 375/58 |
| 4,943,974 | 7/1990 | Motamedi | 375/1 |

*Primary Examiner*—Robert W. Beausoliel, Jr.
*Assistant Examiner*—Phung My Chung
*Attorney, Agent, or Firm*—Susan L. Lukasik

[57] ABSTRACT

For each of a plurality of modulation techniques, corresponding data reception history information is stored. A particular modulation technique is selected from amongst the plurality of modulation techniques (52). At least one block of data is transmitted using the particular modulation technique (55). A message is received that provides information regarding reception of the at least one block of data, including whether reception of each of the at least one block of data occurred without error (56). The data reception history information is updated for the particular modulation technique using the information regarding reception (57). The data reception history information is used to determine an estimate of transmission signal quality (51).

21 Claims, 3 Drawing Sheets

| MEMORY | | | | |
|---|---|---|---|---|
| MODULATION TECHNIQUE | A | B | C | D |
| NO. OF BLOCKS TRANSMITTED | 0 | 5 | 30 | 10 |
| NO. OF BLOCKS RECEIVED WITH ERROR(S) | 0 | 0 | 2 | 4 |

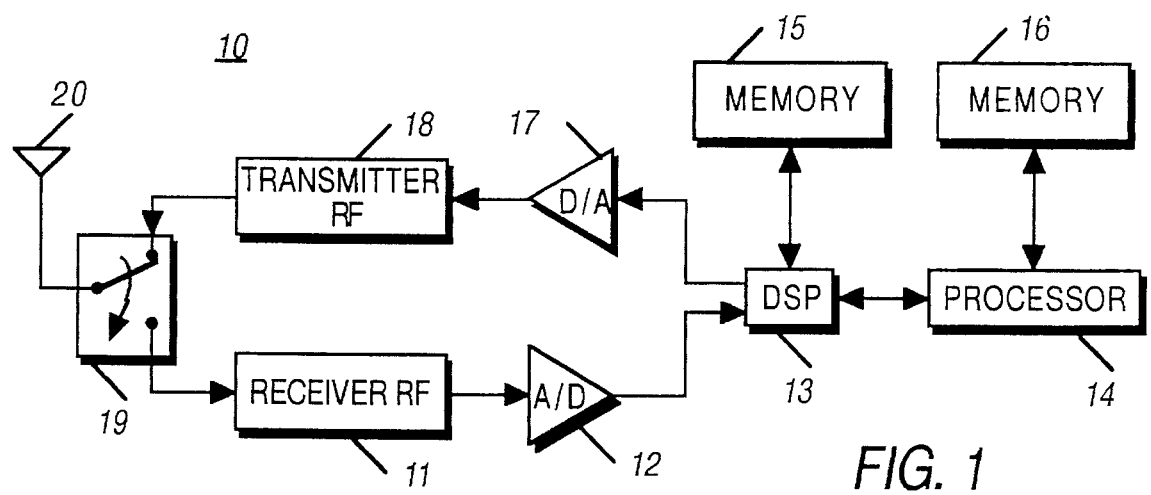
FIG. 1
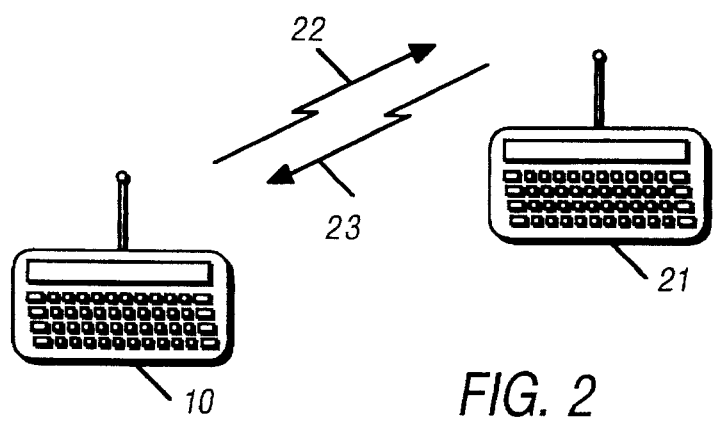
FIG. 2
| MEMORY | | | | |
|---|---|---|---|---|
| MODULATION TECHNIQUE | A | B | C | D |
| NO. OF BLOCKS TRANSMITTED | 0 | 5 | 30 | 10 |
| NO. OF BLOCKS RECEIVED WITH ERROR(S) | 0 | 0 | 2 | 4 |
FIG. 3

COMMUNICATION OF DATA RECEPTION HISTORY INFORMATION

FIELD OF THE INVENTION

This invention relates to data transmission, including but not limited to transmission of data reception history to a communication device.

BACKGROUND OF THE INVENTION

Communication systems on which data is transmitted are well known in the art. Before a user may transmit data, many systems require a data (communication) unit to first request a communication resource, such as a frequency, frequency pair, TDM (time division multiplexed) time slot, and so forth. The system, by way of a controller, receives the request, also known as a reservation request, allocates a communication resource, and transmits a reservation grant that provides the user with the exclusive use of the assigned communication resource during an allotted time.

Imperfect channel conditions found in a mobile radio data system can result in degradation of system performance. Channel conditions that can cause poor message reception include low signal-to-noise ratio, co-channel interference, multipath fading, and so forth. When a data unit fails to receive a message correctly, many systems allow the unit to request a retransmission of the message. Such requests for retransmission and the retransmissions themselves, which may be numerous, consume valuable communication resources, which is inefficient and wasteful in general.

Some wireline systems permit a range of data rates to be used in an attempt to optimize throughput by matching the data rate to the current wireline conditions. In other words, when a wireline channel has good quality conditions, a higher data rate is used, and when wireline channel conditions are poor, a lower data rate is transmitted. The lowest rate (offering the highest level of error protection) is very inefficient, although it has the highest likelihood of successful receipt. If the lowest data rate used under both good and poor signal conditions, transmission overall is inefficient in that a minimal amount of information is transmitted in a fixed time period. While use of a higher data rate for transmission is a more efficient use of wireline channel, such a data rate has the lowest probability of successful reception over all signal conditions, and consequently is not received with the greatest probability of successful decoding, resulting in the need to retransmit data messages. To solve the problem of high efficiency of channel versus high probability of receipt, many systems use a middle-of-the-road data rate, i.e., a rate in between the highest and lowest rates available in the system. Even with a medium data rate, data may not be transmitted reliably due to poor wireline conditions, and the error rate can be significant.

Another method for improving resource efficiency, not relying on modifying the transmission rate, is commonly referred to as an automatic repeat request (ARQ). In such a system, the receiving data unit detects which data frames are received in error and sends a feedback message to the transmitting end requesting that a particular frame, or group of frames, be re-transmitted. In this manner, the rate at which the data is sent over the channel is effectively increased or decreased in response to the channel conditions, and consequently, effective channel throughput changes in response to the channel conditions. Such a method, however, requires a significant amount of overhead, both in channel utilization and in transmission delay. In particular, when channel conditions are poor over an extended period of time, the need for re-transmission is high, and the channel utilization is correspondingly low.

Different techniques for modulating data can be used to achieve effective communication over a particular channel. Such modulation techniques might also incorporate error correction coding to improve performance under poor channel conditions. Advanced modulation techniques are generally more prone to incurring errors, and are likely to use error correction. Error correcting schemes typically increase the amount of overhead, thereby reducing the maximum rate at which data may be sent.

Accordingly, there is a need for a wireless data communication system that efficiently uses system resources over a wide range of channel conditions while limiting overhead that costs valuable bandwidth.

BRIEF DESCRIPTION OF THE DRAWINGS

FIG. 1 is a block diagram of a communication unit in accordance with the invention.

FIG. 2 shows a diagram of communication transfer between two communication units in accordance with the invention.

FIG. 3 is a diagram showing information as stored in a database within a communication unit in accordance with the invention.

DESCRIPTION OF A PREFERRED EMBODIMENT

Figure 4:
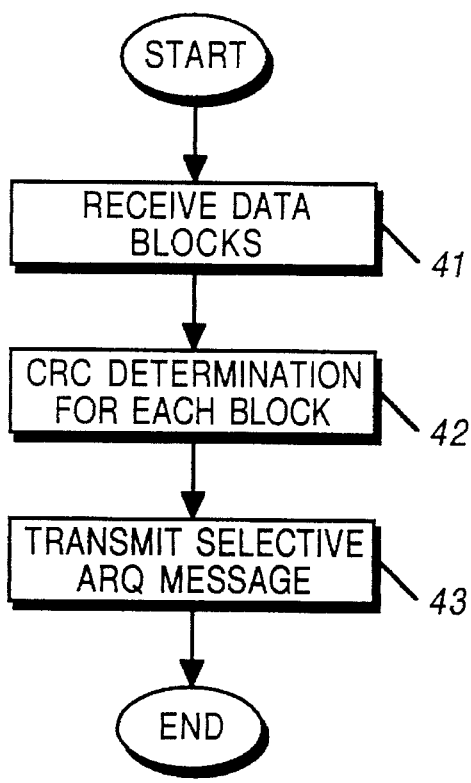
FIG. 4 shows a flow chart of communication unit activity in accordance with the invention.

The following describes an apparatus for and method of transmission of data reception history information. This transmission facilitates determination of the quality of the communication resource used to send information from a source communication unit to a destination communication unit. Once the quality of the communication resource is known by the source communication unit, it may choose the modulation method that it will use for transmitting to the destination communication unit, such that the efficiency of the use of communication resources is optimized, including time spent using communication resources.

For each of a plurality of modulation techniques, corresponding data reception history information is stored. A particular modulation technique is selected from amongst the plurality of modulation techniques. At least one block of data is transmitted using the particular modulation technique. A message is received that provides information regarding reception of the at least one block of data, including whether reception of each of the at least one block of data occurred without error. The data reception history information is updated for the particular modulation technique using the information regarding reception.

Alternatively, the corresponding data reception history includes a value that identifies how many blocks of data have been transmitted to a target destination and received by the target destination over a predetermined period of time. In addition, the corresponding data reception history may include, for each of the plurality of modulation techniques, a value that identifies, for each of the plurality of modulation techniques, how many blocks of data have been transmitted to a target destination and received by the target destination over a predetermined period of time. The corresponding data reception history may include a value that identifies how many blocks of data have been transmitted to a target destination and received with error by the target destination over a predetermined period of time, and may also includes, for each of the plurality of modulation techniques, a value that identifies, for each of the plurality of modulation techniques, how many blocks of data have been transmitted to a target destination and received with error by the target destination over a predetermined period of time.

In an alternative embodiment, the corresponding data reception history includes, for each of the plurality of modulation techniques, a value that identifies, for each of the plurality of modulation techniques, how many blocks of data have been received with error by the target destination over a predetermined period of time.

The corresponding data reception history includes a first value that identifies how many blocks of data have been transmitted to a target destination and received by the target destination over a first predetermined period of time, and a second value that identifies how many blocks of data have been transmitted to a target destination and received with error by the target destination over a second predetermined period of time. The first and second predetermined periods of time can be the same.

In an alternative embodiment, the corresponding data reception history includes, for each of the plurality of modulation techniques a first value that identifies, for each of the plurality of modulation techniques, how many blocks of data have been transmitted to a target destination and received by the target destination over a first predetermined period of time, and a second value that identifies, for each of the plurality of modulation techniques, how many blocks of data have been transmitted to a target destination and received with error by the target destination over a second predetermined period of time.

In another alternative embodiment, the corresponding data reception history includes, for each of the plurality of modulation techniques a first value that identifies, for each of the plurality of modulation techniques, how many blocks of data have been transmitted to a target destination over a first predetermined period of time, and a second value that identifies, for each of the plurality of modulation techniques, how many blocks of data have been received with error by the target destination over a second predetermined period of time.

In one embodiment, the data reception history information is used to determine an estimate of transmission signal quality. The data reception history information includes, for each of the plurality of modulation techniques a value for a number of blocks of data that have at least been transmitted over a predetermined period of time, and a value for a number of blocks of data that have been transmitted and received with errors over the predetermined period of time. The data reception history information can be updated for each of the plurality of modulation techniques as a function of time. Alternatively, the step of selecting comprises using the value for the number of blocks of data that have been transmitted and received with errors to select the particular modulation technique.

The data reception history information can be used to determine an estimate of transmission signal quality by calculating:

$$\text{Weighted } SQE = \frac{\sum_{i=1}^{X} K_i f_i\left(\frac{E_i}{N_i}\right)}{\sum_{i=1}^{X} K_i},$$

where i is a subscript indicating one of the plurality of modulation techniques; N comprises the value for the number of blocks of data that have been at least transmitted over the predetermined period of time; E comprises the value for the number of blocks of data that have been transmitted and received with errors over the predetermined period of time; X equals how many modulation techniques are in the plurality of modulation techniques; K comprises a weighting constant; and $f_i()$ is a function relating the number of blocks of data that have been received with error to received signal quality.

In an alternative embodiment, the data reception history information can be used to determine an estimate of transmission signal quality including the step of calculating:

$$\text{Weighted } SQE = \frac{\sum_{i=1}^{X} K_i f_i\left(\frac{E_i + Z_i}{N_i}\right)}{\sum_{i=1}^{X} K_i},$$

where i is a subscript indicating one of the plurality of modulation techniques; N comprises the value for the number of blocks of data that have been at least transmitted over the predetermined period of time; E comprises the value for the number of blocks of data that have been transmitted and received with errors over the predetermined period of time; X equals how many modulation techniques are in the plurality of modulation techniques; Z comprises a constant; K comprises a weighting constant; and $f_i()$ is a function relating the number of blocks of data that have been received with error to received signal quality.

In an alternative embodiment, corresponding data reception history information is stored for each of a plurality of modulation techniques. A particular modulation technique is selected from amongst the plurality of modulation techniques. At least one block of data is transmitted using the particular modulation technique. A message is received that provides information regarding reception of the at least one block of data, including whether reception of each of the at least one block of data occurred without error. When the at least one transmitted block of data is not received, the at least one block of data is assumed to be received with error. The data reception history information is updated for the particular modulation technique using the information regarding reception. The corresponding data reception history may include a value that identifies how many blocks of data have been transmitted to a target destination over a predetermined period of time and a value that identifies how many blocks of data were received with error by a target destination over a predetermined period of time.

Alternatively, a method for determining transmission signal quality in a two-way radio includes storing corresponding data reception history information, for each of four modulation techniques, in a database, wherein the corresponding data reception history includes, for each of the modulation techniques a first value that identifies, for each modulation technique, how many blocks of data have been transmitted to a target destination and received by the target destination over a first predetermined period of time, and a second value that identifies, for each modulation technique, how many blocks of data have been transmitted to a target destination and received with error by the target destination over a second predetermined period of time. A particular modulation technique is selected from amongst the four modulation techniques. At least one block of data is transmitted using the particular modulation technique. A selective automatic repeat request message is received that provides information regarding reception of the at least one block of data, including whether reception of each of the at least one block of data occurred without error. The data reception history information is updated for the particular modulation technique using the information regarding reception. The data reception history information is used to determine an estimate of transmission signal quality.

FIG. 1 is a block diagram of a communication unit 10 in accordance with the invention. A radio frequency (RF) receiver 11 receives information from an antenna 20, after it passes through an antenna switch 19. The receiver 11 processes the information and outputs the result to an analog to digital (A/D) converter 12. The output of the A/D 12 is input to a DSP (digital signal processor) 13. The DSP 13, such as a DSP51666 available from Motorola, Inc., processes information and outputs it to a processor 14, such as a 68HC16 microprocessor available from Motorola, Inc. The information thus delivered to the processor 14 is typically stored in the memory 16, or may be output to a display or other output device, not shown. The DSP 13 has its own allotted memory 15, and the processor 14 has its own allotted memory 16 as well. The processor 14 sends information, received from a keyboard or other input device, to be transmitted to the DSP 13, which processes the information and sends it to a digital to analog (D/A) converter 17. The transmitter 18 converts and/or modulates the analog information to the desired radio frequency for transmission. The transmitter 18 output passes through the antenna switch 19 to the antenna 20 where it is radiated. The communication unit 10 may be a MIRS Portable radio or a MIRS Mobile radio, available from Motorola, Inc.

FIG. 2 shows a diagram of communication transfer between two communication units. The source communication unit 10 transmits a data message 22 to the destination communication unit 21 using one of a plurality of predefined modulation techniques. The destination communication unit 21 transmits an acknowledgment message 23 to the source communication unit based on the quality of reception of the data message 22. The data message 22 consists of one or more blocks of data, the first block of which typically indicates the total number of data blocks in the message. After the destination communication unit 21 receives the message 22, it determines which of the blocks were received correctly and which were received in error. The acknowledgment message 23 contains an indication of the reception status of each of the blocks that were in the data message 22. The format of the acknowledgment message 23 may be a selective ARQ (automatic repeat request) message, as is known in the art.

FIG. 3 is a diagram showing information as stored in a database 30 within the memory 16 of the source communication unit 10. The database 30 is updated upon receipt of the acknowledgment message 23 sent from the destination communications unit 21. The database 30 includes information regarding the history of data reception, also called data reception history information, for data messages received at the destination communication unit 21 for each modulation technique used within the source communication unit 10. In the preferred embodiment of the present invention, the data reception history contained in the database 30 contains the total number of blocks known by the destination communication unit 21 to have been transmitted by the source communication unit 10 within a certain time period for each modulation technique. This number is based on the number of blocks indicated, in the acknowledgment message 23, as having been received. The period of time may be, for example, 10 seconds to 2 minutes. For each modulation technique, the database 30 also contains the number of blocks known to have been received with error, typically within the same period of time. The acknowledgment messages 23 sent from the destination communication unit 21 to the source communication unit 10 contain the error status of each of the received blocks from within messages 22. In an alternative embodiment, the source communication unit 10 may use the actual number of blocks it has transmitted, instead of the number of blocks the destination communication unit 21 acknowledged as having been received, as the number of blocks transmitted in the database 30.

In the preferred embodiment of the present invention, the first block of the data message 22 contains control information used to determine if the remaining blocks were received correctly. If the first block was received incorrectly, the destination communication unit 21 will not transmit the acknowledgment message 23, and instead awaits a retransmission of the data message 22 from the source communication unit 10. The source communication unit 10 typically uses a timer, as is well known in the art, to trigger the retransmission of the data message in the event that an acknowledgment message is not received. Because no acknowledgment message is received at the source communication unit, the data reception history database 30 is not updated to contain information regarding the blocks sent in the data message.

FIG. 4 shows a flow chart of activity at the destination communication unit 21 when it receives a message 22 transmitted by the source communication unit 10. At step 41, the destination communication unit 21 receives the data message 22 comprising data blocks from the source communication unit 10. At step 42, a CRC (cyclic redundancy check) is determined for each block of information that is received in order to ascertain which blocks were received correctly and which blocks were received with error(s). The message 23 transmitted from the destination communication unit 21 to the source communication unit 10 in step 43 identifies which blocks were received correctly and which were received incorrectly so that the source communication unit 10 knows which ones need to be retransmitted. In the preferred embodiment, this message is in the form of a selective ARQ message. In an alternative embodiment, other forms of ARQ known in the art, such as Go-Back N, NACK (negative acknowledgment), or any other type which provides information as to whether blocks are received correctly or with error, can be used with equal success in the present invention.

Figure 5:
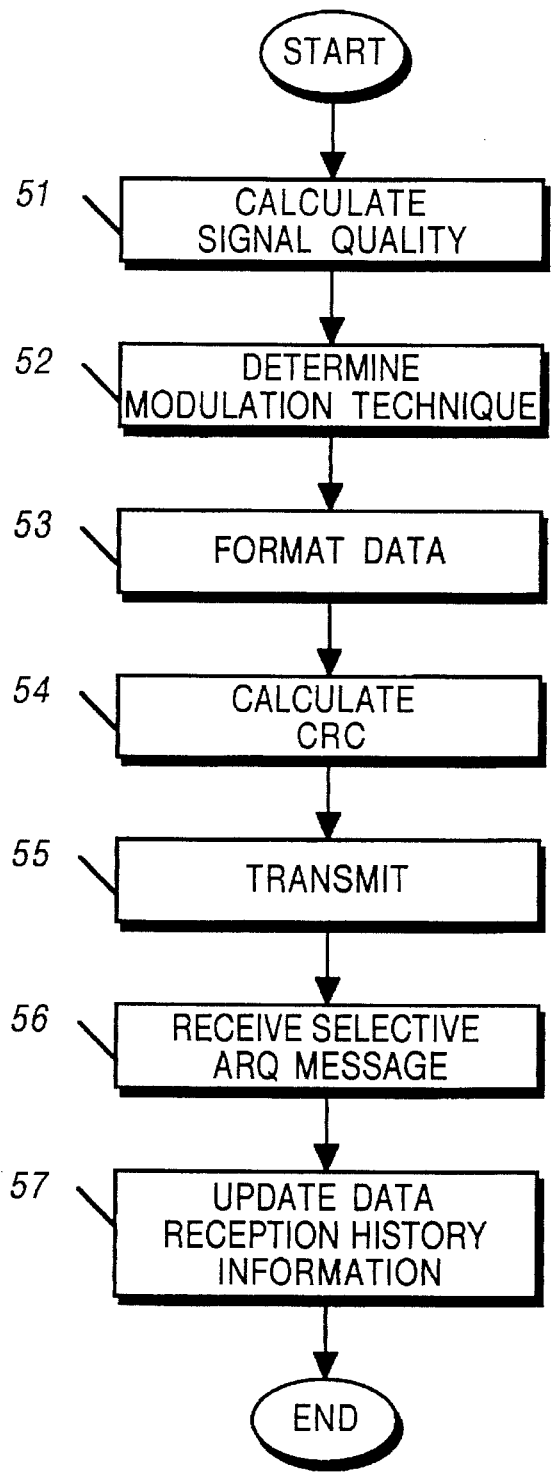
FIG. 5 is a flow chart showing communication unit operation in accordance with the present invention.

FIG. 5 is a flow chart showing operation at the source communication unit in accordance with the present invention. At step 51, the source communication unit 10 calculates a signal quality estimate (SQE) for the communication resource for each modulation technique available to the transmitter. In the preferred embodiment, the source communication unit 10 performs a calculation using information from the database 30 in order to compute the SQE of the signals that are received by the destination communication unit 21 from the source communication unit 10. The quality of the signals received over the communication resource is typically a direct indication of the quality of the resource itself. The final estimate consists of a weighted average of individual quality estimates made based on the history of data block receptions, as found in the database 30, for each of the distinct modulation methods. This weighting method gives approximately equal influence to the signal quality information obtained from the reception of each data block that was sent rather than giving equal weight to each of the four modulation methods, regardless of the number of blocks sent using each method. In the preferred embodiment, a weighted SQE is computed using the equation:

$$\text{Weighted } SQE = \frac{\sum_{i=1}^{X} K_i f_i\left(\frac{E_i + Z_i}{N_i}\right)}{\sum_{i=1}^{X} K_i}.$$

Figure 7:
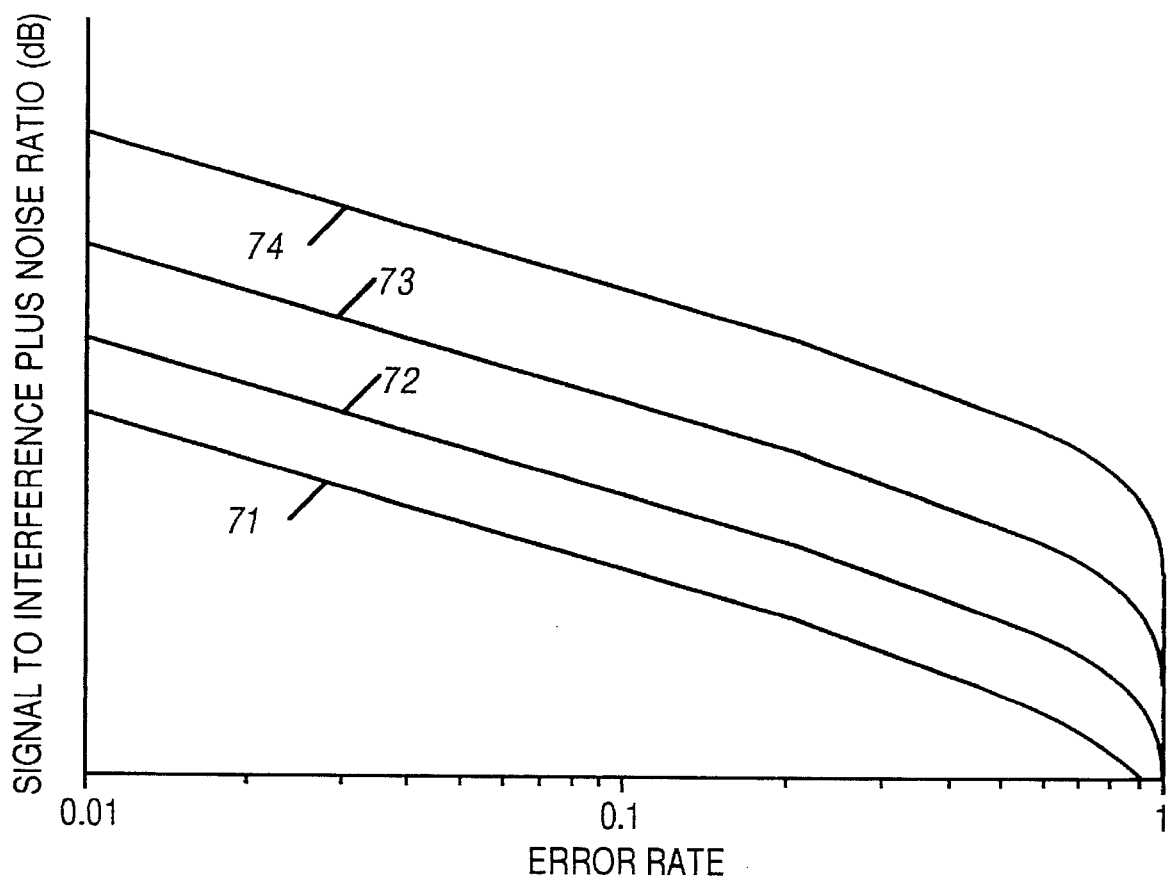
FIG. 7 is a plot showing error rate versus signal to interference plus noise ratio in accordance with the invention.

In this equation, X represents the total number of modulation techniques or methods that may be used to transmit data. Each of the modulation techniques have a corresponding value of the subscript index i. K comprises a weighting constant whose value determines the degree of influence in the weighted signal quality estimate that is given to the signal quality estimate of the individual modulation technique being considered. If the value $K_i$ in the equation is set to the same value as $N_i$, the weighting method gives approximately equal influence to the signal quality information obtained from the reception of each data block that was sent rather than giving equal weight to each of the four modulation methods, regardless of the number of blocks sent using each method. $N_i$ is the number of blocks known to have been transmitted over a period of time using modulation technique i, as obtained from the database 30. $E_i$ is the number of blocks known to have been transmitted and were received in error, also obtained from the database 30. $E_i/N_i$ is a value referred to as the block miss rate (BMR), which is the fraction of blocks transmitted with such signal quality that they could not be received correctly. $f_i()$ is a function which relates a BMR value to SINR, signal to interference plus noise ratio. SINR is expressed mathematically on a linear scale as S/(I+N), and is represented in decibels for modulation technique number i. An example of $f_i()$ is shown in FIG. 7, which will be described later.

In the preferred embodiment, $Z_i$ is the "zero error factor" for modulation method number i. $Z_i$ is used to compensate for a situation that arises when zero block errors are recorded in the database 30 for a modulation technique at which data blocks have been received (i.e., $N_i$ not equal to zero). A small fractional "zero error factor" constant is added to the block error count $E_i$ for that modulation technique to yield a non-zero BMR for the zero error case. When this factor is added, the calculated BMR for the modulation technique asymptotically approaches zero as additional blocks are received correctly (without error) using that modulation technique. Using $Z_i$ prevents cases in which only a few blocks have been sent and all were received without error from being treated as a reliable indication of very high SINR conditions. Because $Z_i$ is not a necessary part of the equation, but rather an improvement, weighted SQE may be calculated as if $Z_i=0$, in which case, $$\text{Weighted } SQE = \frac{\sum_{i=1}^{X} K_i f_i\left(\frac{E_i}{N_i}\right)}{\sum_{i=1}^{X} K_i}.$$

At step 52, the source communication unit 10 determines the modulation technique that it will use for the upcoming transmission. In the preferred embodiment, the determination of modulation technique is based on the estimate of the quality of the communication resource determined in step 51. At step 53, the source communication unit 10 formats the blocks of data using the modulation technique selected in step 52. At step 54, the source communication unit 10 calculates CRCs for each of the outgoing data blocks and appends the corresponding CRC to each block. At step 55, each of the data blocks and its corresponding CRC is sent consecutively as a single message transmission. At step 56, the source communication unit 10 receives the selective ARQ message transmitted by the destination communication unit 21 in step 43 of FIG. 4. At step 57, the source communication unit 10 updates its database 30 of information regarding the history of data reception at the destination communication unit 21 for each modulation technique used within the source communication unit 10. The process ends at step 58.

Figure 6:
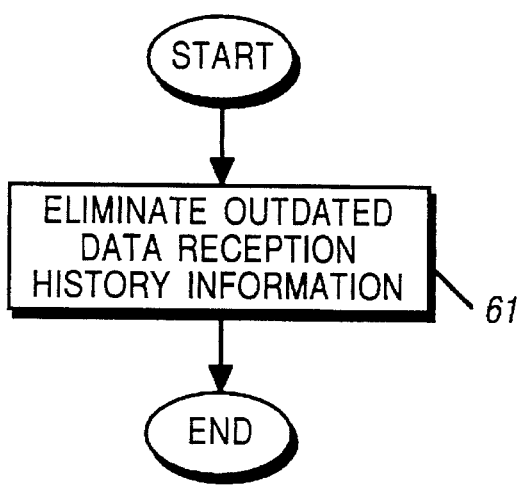
FIG. 6 is a flow chart showing communication unit operation with respect to database maintenance in accordance with the invention.

FIG. 6 is a flow chart showing source communication unit 10 operation with respect to database 30 maintenance. The data reception history contained in the database 30 includes the total number of blocks known by the destination communication unit 21 to have been transmitted by the source communication unit 10 within a certain time period for each modulation technique and also the corresponding numbers of blocks known to have been transmitted that were received with errors. At step 61, the source communication unit 10 periodically updates the database 30 so as to eliminate measurements relating to transmissions that occurred before the current time period. This update operation occurs after a period of time elapses in order to allow the database to reflect only recent signal quality conditions. Database updating occurs on an ongoing basis. Alternatively, measurements relating to transmissions that occurred before the current time period may be used with a different weighting factor in the estimation of signal quality.

A graph of $f_i()$ is shown in FIG. 7, which shows an empirically determined relation between SINR and BMR. In order to estimate SINR conditions that occurred for transmissions using a specific modulation technique, the BMR of blocks sent using that technique within some period of time is calculated based on information from the database 30. The BMR is found on the horizontal axis of the graph, and the SINR estimate is read off of the vertical axis. These curves are representative of those which might occur when using four distinct modulation techniques. The actual curves that are used depends on the particular techniques chosen. Generation of such curves is well known in the art. Successful implementation of the present invention is not dependent on any particular modulation technique(s).

Use of the present invention is advantageous over known methods used to estimate signal quality in that this method makes use of information that is already provided by messages sent from the destination communication unit 21 to the source communication unit 10 in a system using an ARQ protocol. No additional information is transmitted between the two communication units that is not normally transmitted by units involved in ARQ operation. In systems not already using an ARQ protocol, the additional information is minimal. The method allows a continual assessment of signal quality and does not require the wasteful transmission of data for the sole purpose of testing the channel.

What is claimed is:

1. A method comprising the steps of:

for each of a plurality of modulation techniques, storing corresponding data reception history information;

selecting a particular modulation technique from amongst the plurality of modulation techniques;

transmitting at least one block of data using the particular modulation technique;

receiving a message that provides information regarding reception of the at least one block of data, including whether reception of each of the at least one block of data occurred without error;

updating the data reception history information for the particular modulation technique using the information regarding reception.

2. The method of claim 1, wherein the corresponding data reception history includes a value that identifies how many blocks of data have been transmitted to a target destination and received by the target destination over a predetermined period of time.

3. The method of claim 1, wherein the corresponding data reception history includes, for each of the plurality of modulation techniques, a value that identifies, for each of the plurality of modulation techniques, how many blocks of data have been transmitted to a target destination and received by the target destination over a predetermined period of time.

4. The method of claim 1, wherein the corresponding data reception history includes a value that identifies how many blocks of data have been transmitted to a target destination and received with error by the target destination over a predetermined period of time.

5. The method of claim 1, wherein the corresponding data reception history includes, for each of the plurality of modulation techniques, a value that identifies, for each of the plurality of modulation techniques, how many blocks of data have been transmitted to a target destination and received with error by the target destination over a predetermined period of time.

6. The method of claim 1, wherein the corresponding data reception history includes, for each of the plurality of modulation techniques, a value that identifies, for each of the plurality of modulation techniques, how many blocks of data have been received with error by the target destination over a predetermined period of time.

7. The method of claim 1, wherein the corresponding data reception history includes:

a first value that identifies how many blocks of data have been transmitted to a target destination and received by the target destination over a first predetermined period of time; and a second value that identifies how many blocks of data have been transmitted to a target destination and received with error by the target destination over a second predetermined period of time.

8. The method of claim 7, wherein the first and second predetermined periods of time are the same.

9. The method of claim 1, wherein the corresponding data reception history includes, for each of the plurality of modulation techniques:

a first value that identifies, for each of the plurality of modulation techniques, how many blocks of data have been transmitted to a target destination and received by the target destination over a first predetermined period of time; and a second value that identifies, for each of the plurality of modulation techniques, how many blocks of data have been transmitted to a target destination and received with error by the target destination over a second predetermined period of time.

10. The method of claim 9, wherein the first and second predetermined periods of time are the same.

11. The method of claim 1, wherein the corresponding data reception history includes, for each of the plurality of modulation techniques:

a first value that identifies, for each of the plurality of modulation techniques, how many blocks of data have been transmitted to a target destination over a first predetermined period of time; and a second value that identifies, for each of the plurality of modulation techniques, how many blocks of data have been received with error by the target destination over a second predetermined period of time.

12. The method of claim 1, and further including the step of additionally updating the data reception history information for each of the plurality of modulation techniques as a function of time.

13. The method of claim 1, and further including the step of using the data reception history information to determine an estimate of transmission signal quality.

14. The method of claim 13, wherein the data reception history information includes, for each of the plurality of modulation techniques:

a value for a number of blocks of data that have at least been transmitted over a predetermined period of time;

a value for a number of blocks of data that have been transmitted and received with errors over the predetermined period of time.

15. The method of claim 14, wherein the step of selecting further comprises using the value for the number of blocks of data that have been transmitted and received with errors to select the particular modulation technique.

16. The method of claim 14, wherein the step of using the data reception history information to determine an estimate of transmission signal quality includes the step of calculating:

$$\text{Weighted } SQE = \frac{\sum\limits_{i=1}^{X} K_i f_i \left( \frac{E_i}{N_i} \right)}{\sum\limits_{i=1}^{X} K_i},$$

wherein:

i is a subscript indicating one of the plurality of modulation techniques;

N comprises the value for the number of blocks of data that have been at least transmitted over the predetermined period of time;

E comprises the value for the number of blocks of data that have been transmitted and received with errors over the predetermined period of time;

X equals how many modulation techniques are in the plurality of modulation techniques;

K comprises a weighting constant; and $f_i()$ is a function relating the number of blocks of data that have been received with error to received signal quality.

17. The method of claim 14, wherein the step of using the data reception history information to determine an estimate of transmission signal quality includes the step of calculating:

$$\text{Weighted } SQE = \frac{\sum\limits_{i=1}^{X} K_i f_i \left( \frac{E_i + Z_i}{N_i} \right)}{\sum\limits_{i=1}^{X} K_i},$$

wherein:

i is a subscript indicating one of the plurality of modulation techniques;

N comprises the value for the number of blocks of data that have been at least transmitted over the predetermined period of time;

E comprises the value for the number of blocks of data that have been transmitted and received with errors over the predetermined period of time;

X equals how many modulation techniques are in the plurality of modulation techniques;

Z comprises a constant;

K comprises a weighting constant; and $f_i()$ is a function relating the number of blocks of data that have been received with error to received signal quality.

18. A method comprising the steps of:

for each of a plurality of modulation techniques, storing corresponding data reception history information;

selecting a particular modulation technique from amongst the plurality of modulation techniques;

transmitting at least one block of data using the particular modulation technique;

receiving a message that provides information regarding reception of the at least one block of data, including whether reception of each of the at least one block of data occurred without error;

when the at least one transmitted block of data is not received, assuming the at least one block of data was received with error;

updating the data reception history information for the particular modulation technique using the information regarding reception.

19. The method of claim 18, wherein the corresponding data reception history includes a value that identifies how many blocks of data have been transmitted to a target destination over a predetermined period of time.

20. The method of claim 18, wherein the corresponding data reception history includes a value that identifies how many blocks of data received with error by a target destination over a predetermined period of time.

21. A method for determining transmission signal quality in a two-way radio, comprising the steps of:

for each of four modulation techniques, storing corresponding data reception history information in a database, wherein the corresponding data reception history includes, for each of the modulation techniques:

a first value that identifies, for each modulation technique, how many blocks of data have been transmitted to a target destination and received by the target destination over a first predetermined period of time; and a second value that identifies, for each modulation technique, how many blocks of data have been transmitted to a target destination and received with error by the target destination over a second predetermined period of time;

selecting a particular modulation technique from amongst the four modulation techniques;

transmitting at least one block of data using the particular modulation technique;

receiving a selective automatic repeat request message that provides information regarding reception of the at least one block of data, including whether reception of each of the at least one block of data occurred without error;

updating the data reception history information for the particular modulation technique using the information regarding reception;

using the data reception history information to determine an estimate of transmission signal quality.

\* \* \* \* \*